United States Patent [19]

Gerrish

[11] Patent Number: 5,327,708
[45] Date of Patent: Jul. 12, 1994

[54] CROP TESTING AND EVALUATION SYSTEM

[76] Inventor: Steven R. Gerrish, Rte. 5, WH7, Elkhorn, Wis. 53121

[21] Appl. No.: 717,285

[22] Filed: Jun. 20, 1991

Related U.S. Application Data

[63] Continuation-in-part of Ser. No. 661,345, Feb. 28, 1991, Pat. No. 5,173,079.

[51] Int. Cl.⁵ .................. A01C 7/00; A01D 41/00; A01F 12/00
[52] U.S. Cl. .................................. 56/1; 56/10.2; 56/DIG. 2; 56/DIG. 15; 460/7
[58] Field of Search ............... 56/1, 10.2, DIG. 2, 56/DIG. 15, 10.2 R; 460/1, 6, 7; 177/139; 264/420

[56] References Cited

U.S. PATENT DOCUMENTS

| | | |
|---|---|---|
| 1,203,285 | 10/1916 | Webber . |
| 1,870,240 | 8/1932 | Domaica . |
| 2,756,983 | 7/1956 | Furcini . |
| 3,065,808 | 11/1962 | Dodgen . |
| 3,073,099 | 1/1963 | Andersen ............ 56/10.2 X |
| 3,606,742 | 9/1971 | Wieneke et al. ........ 460/7 X |
| 3,961,247 | 6/1976 | Toki . |
| 4,403,191 | 9/1983 | Satake . |
| 4,487,278 | 12/1984 | Rosenthal . |
| 4,621,229 | 11/1986 | Hirth . |
| 4,722,408 | 2/1988 | Van De Vliert . |
| 4,766,964 | 8/1988 | Hirota et al. . |
| 4,852,028 | 7/1989 | Korpela et al. . |
| 4,919,222 | 4/1990 | Kyrtsos et al. . |
| 4,929,904 | 5/1990 | Bohman et al. ............ 56/10.2 |
| 4,951,031 | 8/1990 | Stubbe ..................... 56/10.2 |
| 5,092,819 | 3/1992 | Schroeder et al. ......... 56/10.2 X |

OTHER PUBLICATIONS

Carter Agronomy Research Equipment, Carter Manufacturing Co. Brochure.
"New From Denmark's Technology Show," *Fin*, Mid-Mar. 1991 (p. 22).

*Primary Examiner*—George A. Suchfield
*Attorney, Agent, or Firm*—Henderson & Sturm

[57] ABSTRACT

The crop testing and evaluation system includes a plurality of measuring and testing devices that measure the weight, moisture content, and test weight of a crop. Other measuring devices that test the crop for characteristics such as protein content, sugar content, oil content and color may also be included. Mounting accessories are included in the system for attaching the measuring devices to the crop gathering compartment of a harvesting vehicle. As the crop is harvested and fed to the compartment, periodic readings of the measuring devices are taken by a microprocessor and supplied to a computer for analysis and evaluation. Preferably, the microprocessor and computer are positioned in the cab of the harvesting vehicle within reach of the harvest operator. The present invention also provides an efficient method of evaluating research products, such as plant hybrids and varieties.

9 Claims, 10 Drawing Sheets

CROP TESTING AND EVALUATION SYSTEM

CROSS REFERENCE TO RELATED APPLICATION

This application is a continuation-in-part of application Ser. No. 661,345, filed Feb. 28, 1991, now U.S. Pat. No. 5,173,079 incorporated herein by reference.

BACKGROUND OF THE INVENTION

The invention relates generally to a crop testing and evaluating system that allows a farmer to collect and generate information pertaining to the economic, quantitative and qualitative value of a crop, such as grain, forage, hay, or other harvestable produce, and in particular, to a system that may be used while the crop is being harvested. The invention provides an efficient method of evaluating research products, such as plant hybrids or varieties.

Traditionally, when farmers harvest a crop such as corn, wheat or other grain, they will transport the harvested grain to a grain elevator for storage and sale. Typically, the grain elevator operator will conduct a number of tests on the harvested grain to determine the value of the grain and consequently the price for which the grain elevator operator will purchase the harvested grain from the farmer. Such tests may include testing the harvested grain for its weight, percentage of moisture content, test weight, or other characteristics. Normally, the farmer will not know the quality and value of his or her harvested crop until after the grain has been delivered to the grain elevator operator and has been tested and evaluated by the operator. Regularly, farmers may store some of the harvested grain on the farm and take such measurements while the grain is stored in bins or cribs in a storage area.

In both cases, however, the farmer is unable to match the tested grain with the field from which it was produced without considerable record keeping and inefficient expenditure of time, money and labor during harvesting. Consequently, the farmer is often unable to determine which field, for example, should have its cultural and environmental conditions changed in order to increase the productivity of the field.

In addition, new genetic varieties or strains of grains are continually being developed and researched. As a result, farmers sometimes will experiment with these new varieties of grains to find the most productive and profitable strains in which to grow. With the conventional method of testing a harvested crop by bringing the entire crop to a grain elevator for evaluation, it is difficult for farmers to accurately determine which varieties of grain may be the most productive and profitable. The seed corn industry, for example, will typically expend a considerable amount of time and money on research and testing of new plant varieties.

Currently, there does not exist an efficient and effective system by which a farmer can accurately evaluate the economic value and quality of a crop during harvesting. Nor is there an efficient and effective system whereby the farmer can grow and harvest a variety of crops under various environmental conditions and be able to determine a value of the various crops and accurately match this value with the fields from which the crops came.

There are two basic types of experimental testing techniques used for the evaluation of plant hybrids and varieties (genotypes). The first technique uses relatively small, experimental plots generally ranging from eight to 20 feet in length and two rows in width. These small, experimental plots are planted in ranges, and multiple genotypes can be planted in one continuous process across a field. As the planter makes one trip across the field, two or more genotypes are planted in designated plots (locations) in the field. The second technique for evaluating plant hybrids and varieties uses large-sized plots, called strip plots, generally ranging in length from several hundred feet up to several thousand feet or more. Strip plots are not planted in ranges, and only one genotype is planted as the planter makes one trip across the field.

SUMMARY OF THE INVENTION

The present invention provides a system whereby a crop can be tested and assigned economic, quantitative and qualitative values during the harvesting of the crop, rather than after delivery to a purchaser such as a grain elevator owner. Accordingly, a testing and evaluation assembly for testing characteristics of a crop and for use with a vehicle having a crop storage tank is provided. The assembly includes first crop collection means for collecting a first quantity of crop and weighing means for determining a weight of the first quantity of crop and outputting a first signal corresponding to the weight of the crop. Attaching means are provided for attaching the first crop collection means and the weighing means to the vehicle. The quality of the crop may be determined using processing means that receive the first signal and determine a value of the crop based on the signal.

The testing and evaluation assembly may also include other measuring devices such as a bulk density determining means for determining a bulk density of a second quantity of crop and moisture content determining means for determining a percentage moisture content of the crop. The output of these determining means are delivered to the processing means for further processing and determination of a quality of the crop.

The present invention combines certain aspects of both the small plot and strip plot techniques described previously. The invention uses intermediately-sized plots which have a length greater than 48 feet and less than 150 feet, and a width greater than two rows and less than 21 rows. The method of the present invention greatly improves the efficiency of handling plots of relatively larger size while maintaining the important features of larger strip plots for use in marketing and research. This new method reduces the amount of seed required for testing each genotype and reduces the time and labor involved in planting and harvesting research plots. This greater efficiency obtained by faster planting and harvesting of intermediately-sized plots allows more hybrids or varieties to be tested under a greater number of environments.

BRIEF DESCRIPTION OF THE DRAWINGS

In the accompanying drawings, in which like reference characters indicate like parts.

DETAILED DESCRIPTION OF THE PREFERRED EMBODIMENTS

The invention relates to a crop testing and evaluation system for testing and measuring crops, such as grain, forage, hay, vegetables, and fruit, and for providing immediate results representative of the economic, quantitative, and qualitative values of the crop. A general overview of the system is described first, with a more detailed description of the preferred embodiments of the invention following.

The crop testing and evaluation system of the present invention includes a number of components that operate in cooperation with one another to generate characteristic values of a selected crop. The system is particularly useful during the harvesting of a crop wherein the immediate assessment of a harvested crop may be valuable for making decisions regarding alternative cultural and farming practices such as varying soil type, herbicide and insecticide additions, and fertilization rates, as well as making decisions regarding the marketing of the crop. Accordingly, in a preferred embodiment of the invention, the components of the crop testing system are adapted to be mounted to a harvesting vehicle, such as a combine. It is understood, however, that the crop testing system could be adapted for use with other crop gathering and transporting vehicles or machinery as, for example, grain carts and cotton or forage wagons.

Generally, the crop testing and evaluation system comprises a plurality of measuring and testing devices that measure the weight, moisture content, and test weight of a crop. Other measuring devices that test the crop for characteristics such as protein content, sugar content, oil content, hardness, and color may also be included. Mounting accessories are included in the system for attaching the measuring devices to the crop gathering compartment of a harvesting vehicle. As the crop is harvested and fed to the compartment, periodic readings of the measuring devices are taken by a microprocessor and supplied to a computer for analysis and evaluation. Preferably, the microprocessor and computer are positioned in the cab of the harvesting vehicle within reach of the harvest operator.

There are essentially two preferred embodiments of the invention. Each embodiment further has several alternative arrangements. For purposes of convenience, the preferred embodiments of the invention will be described in connection with a conventional combine for harvesting grain.

Figure 1:
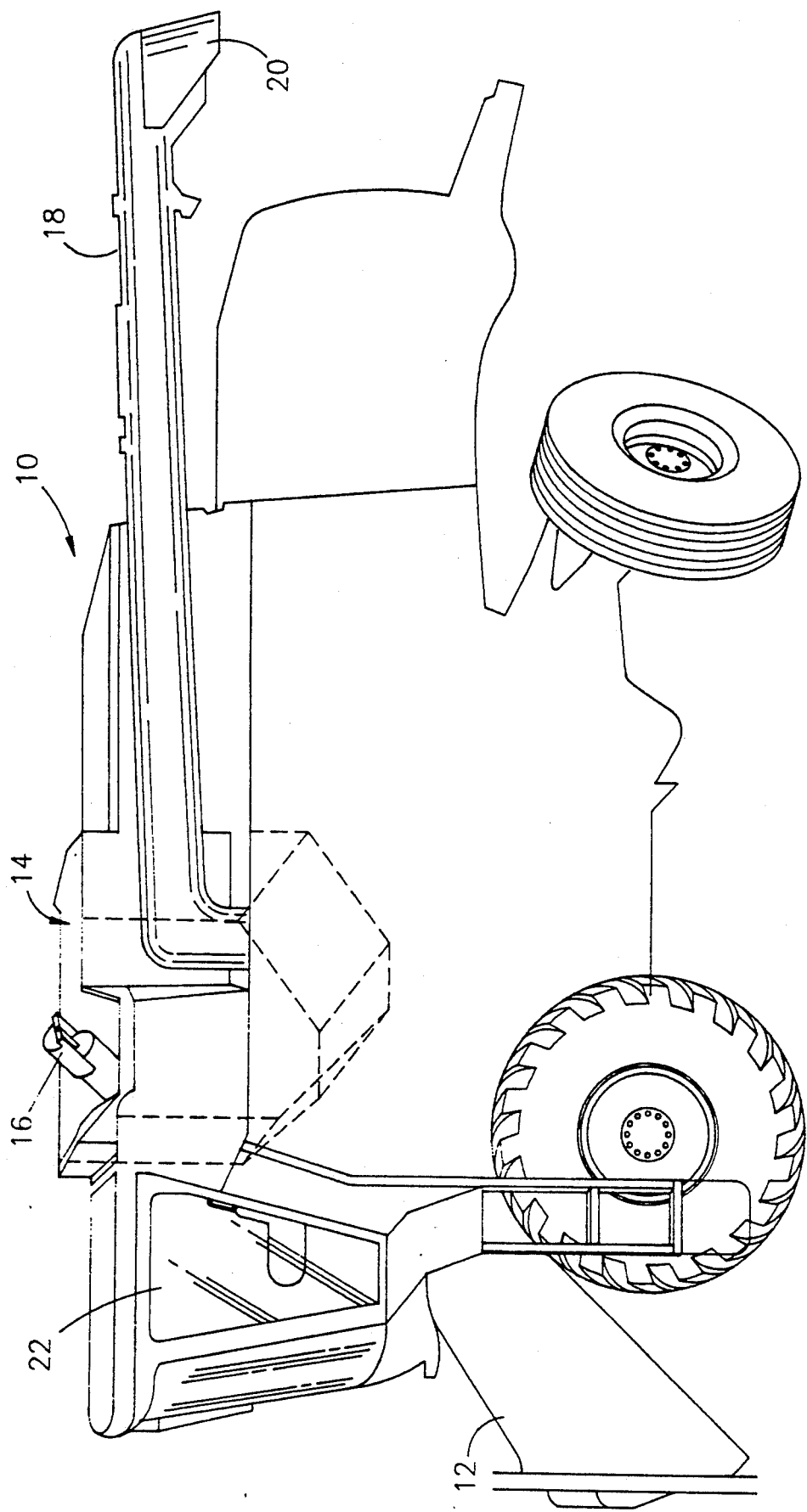
FIG. 1 is a schematic perspective view of a conventional combine.

With reference to FIG. 1, a conventional combine 10 is shown in schematic. The combine 10 has a header for gathering crop from a field and feeding it through a throat 12 into a separation area (not shown) within the combine 10, where the grain is separated out. The separated grain is fed to a grain gathering compartment or grain tank 14 via an auger 16 coupled to the separation area. The general shape of the grain tank 14 is outlined by phantom lines. Typically, such grain tanks 14 may hold from seventy to 250 bushels of grain. The grain tank 14 may be emptied by operating the unloading auger 18, which draws the grain from the tank 14 and dispenses it out the end 20 of the auger 18. The harvest operator controls the combine 10, as well as the positioning and operation of the various machine functions, from within the cab 22.

Figure 2:
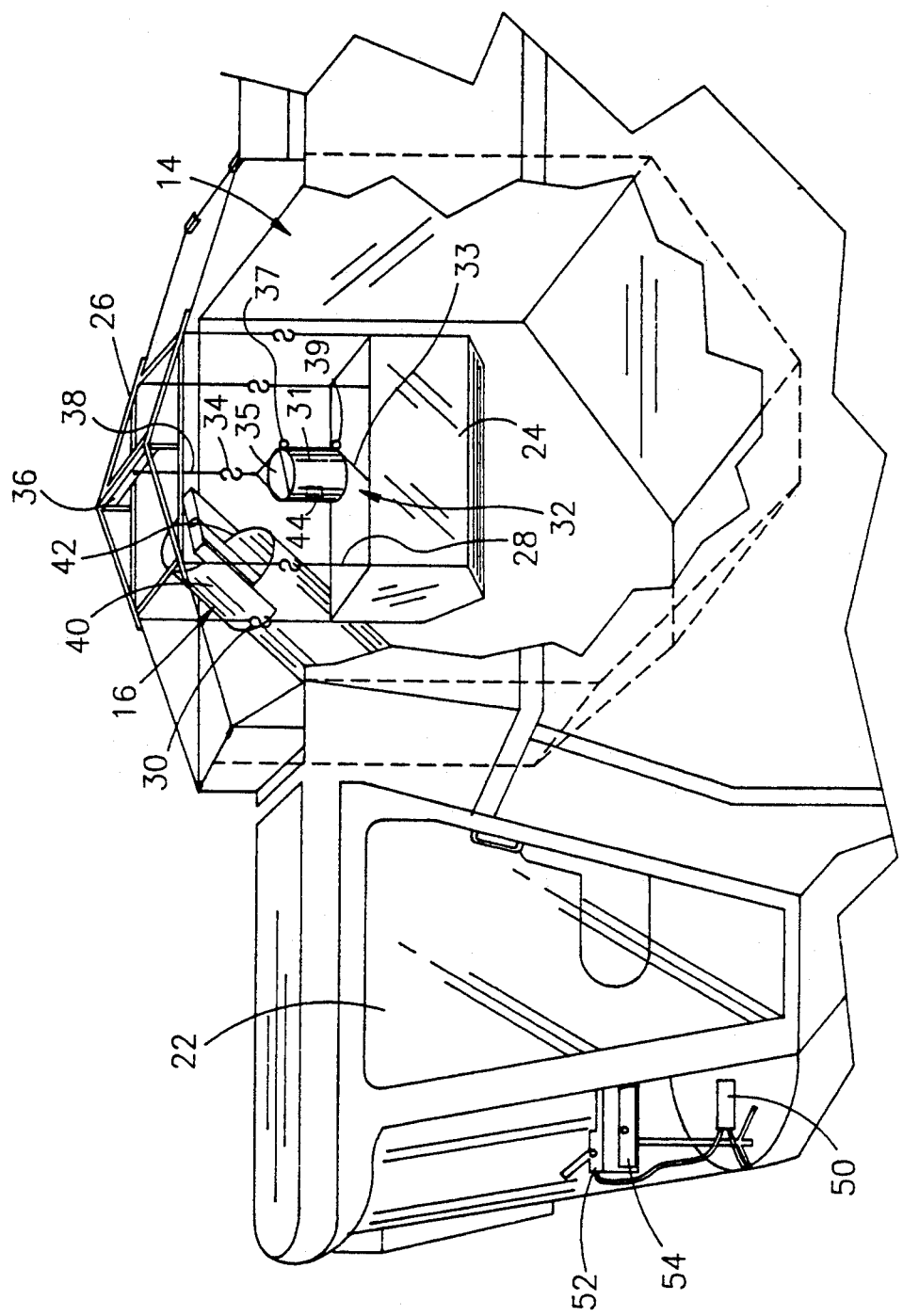
FIG. 2 is an enlarged view of a portion of the combine of FIG. 1, with a section thereof cut away to show a first preferred embodiment of the invention in operational position.

Referring to FIG. 2, an enlarged view of the grain tank 14 and cab 22 of the combine 10 is shown with the various components of a first preferred embodiment of the invention shown in an operating position. Among the components of the invention are several measuring and testing devices including a weigh bucket 24, a test weight device 32, and a moisture sensor 44 located within the test weight device 32. A frame 26 is provided from which the weigh bucket 24 may be suspended. The weigh bucket 24 is designed to take a weight measurement of a relatively large amount of harvested grain, for example, that of an entire harvested plot of crop. The test weight device 32, however, measures the "test weight" of the grain, defined as the bulk density. The device 32 takes a weight measurement of a relatively small, predetermined volume of grain. The output, therefore, is a weight per volume measurement.

The test weight device 32 is a conventional device typically formed from a cylindrical receptacle or canister 31 having an inner diameter of approximately six inches and a length of approximately ten inches. The canister 31 is open on top for receiving grain and has a bottom trap door 33 for releasing the grain once a measurement is made. A striker blade 35 is normally provided for leveling off the top of the canister 31 so that the amount of grain held in the canister 31 is uniform. In a preferred embodiment, the striker blade 35 and trap door 33 of the test weight device 32 are each provided with a conventional motor 37 and 39, respectively, that may be remotely controlled to activate the striker blade 35 and trap door 33. A tension load cell 34 is provided for weighing the test weight device 32 and its contents. A bracket 36 and cable 38 assembly is provided to suspend the test weight device 32 from the frame 26.

Both the weigh bucket 24 and test weight device 32 are suspended from the frame 26 such that the devices hang in the flow path of grain dispensed from the auger 16. An auger hood 40 having an opening 42 may be provided for placement over the top of the auger 16 in order to funnel the flow of grain down into the test weight device 32 and weigh bucket 24. The auger hood 40 may be made from material such as metal, plastic, or rubber and may be secured to the auger 16 with a rubber strap or tape (not shown).

In a preferred embodiment, a plurality of cables 28 and corresponding tension load cells 30, or similar weight measuring devices, are provided for suspending and weighing the weigh bucket 24. Alternatively, a different number of load cells may be used to measure the weight of the weigh bucket 24 and its contents depending on the anticipated weight of the bucket 24 and the load capacity of the cells 30. The details of the weigh bucket 24 and frame 26 are described below with reference to FIGS. 3-7.

The first preferred embodiment of the crop testing system illustrated in FIG. 2 includes a moisture sensor 44 that is preferably mounted to an interior wall of the test weight device 32 using conventional mounting means, such as adhesives or known mounting fixtures or by cutting an opening in the canister 31 and fitting the sensor in the opening. The moisture sensor 44 may be a conventional moisture transducer or conventional moisture probe for measuring the moisture content of grain.

Suitable cabling (not shown in FIG. 2, for clarity) is provided for coupling the measuring devices, i.e., the load cells 30 and 34 for the weigh bucket 24 and test weight device 32, and the sensor 44, to a microprocessor 50 that takes readings from the measurement devices and supplies them as inputs to a computer 52. Computer 52, as described further below, analyzes the test data and provides an evaluation of the tested grain. A printer 54 may be coupled to the computer 52 to provide a hard copy of the evaluated data. In a preferred embodiment of the invention, the computer 52 is a conventional lap-top computer that may be removed from the cab 22 of the combine and the printer 54 is a conventional, portable printer.

Figure 3:
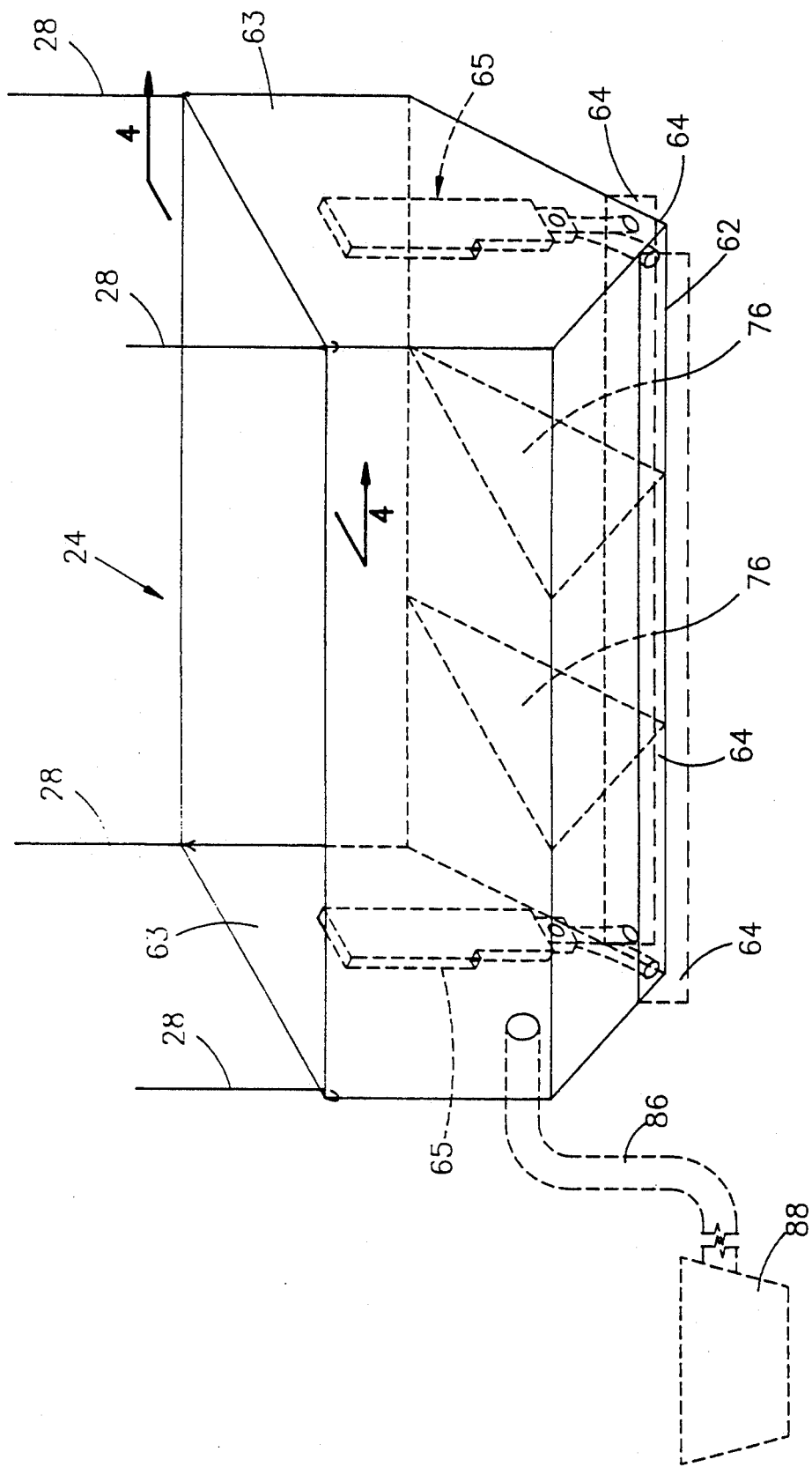
FIG. 3 is a schematic perspective view of a weigh bucket according to the first preferred embodiment of the invention.

FIG. 3 illustrates a preferred embodiment of the weigh bucket 24. The weigh bucket 24 may be made from clear polycarbonate plastic or other suitable material. The weigh bucket 24 is preferably designed to be capable of carrying in the range of 0–430 pounds of grain. In a preferred embodiment, the weigh bucket 24 is approximately twenty-six inches wide, twenty inches deep from the top of the bucket to the bottom apex 62, and is approximately thirty-five inches long. Exact dimensions of the weigh bucket 24 may be different depending on the anticipated size of the sample amount of grain desired to be measured. The weigh bucket 24 preferably has two doors 64 located along the bottom of the bucket 24 that may be opened to release grain from the weigh bucket 24 once a measurement has been made. The doors 64 are shown in an open position by phantom lines.

Two remotely controlled actuator assemblies 65 are attached to the end walls 63 of the weigh bucket 24 for opening and closing the doors 64. Interior walls or baffles 76 may be provided to improve the strength and structural integrity of the bucket, as well as to minimize movement of grain within the bucket 24 when the combine 10 is in motion. As discussed below with reference to FIG. 5, baffles 76 may be used as mounting surfaces for various testing devices in a variation on the first preferred embodiment of the invention.

Figure 4:
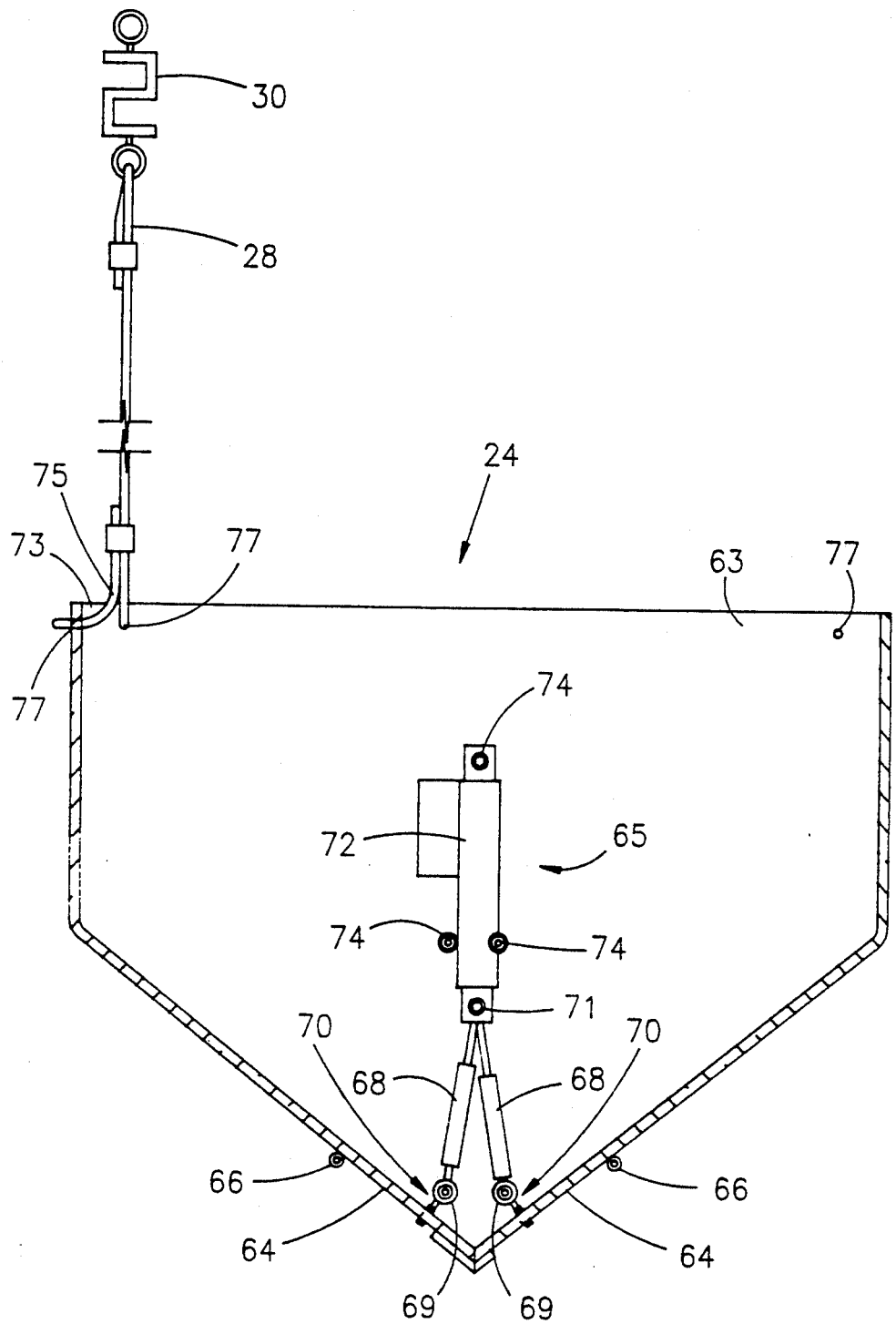
FIG. 4 is an end sectional view of the weigh bucket of FIG. 3.

FIG. 4 illustrates an end view of the weigh bucket 24 and, in particular, shows the details of an actuator assembly 65 for the doors 64 and the manner in which a suspension cable 28 and tension load cell 30 may be coupled to the weigh bucket 24. The doors 64 are mounted to the bucket 24 by hinges 66. Each actuator assembly 65 includes a pair of steel, adjustable eye bolts 68, each having one end 69 coupled to respective doors 64 by a nut and bolt arrangement 70. The other ends 71 of the adjustable eye bolts 68 are pivotably attached to a linear actuator 72 that is bolted to an end wall 63 of the weigh bucket 24 by nut and bolt arrangements 74. The actuator 72 is preferably a known linear actuator, such as a model number S12-09A4-04 actuator manufactured by Warner Electric.

For clarity, FIG. 4 shows only one suspension cable 28 and tension load cell 30 coupled to one corner 73 of the weigh bucket 24. A loop 75 is formed at one end of the cable 28 and is threaded through two holes 77 in the walls of the bucket 24. The tension load cell 30 is fastened to the other end of cable 28. Preferably, four load cells 30, as shown in FIG. 2, are provided for weighing the weigh bucket 24 and any contents therein. The tension load cells 30 may be conventional S-coupons (Artech part number 20210-500) with a combined capacity of about 500 pounds. Different capacity load cells could be used depending on the anticipated weight of grain to be carried by the weigh bucket 24.

Figure 5:
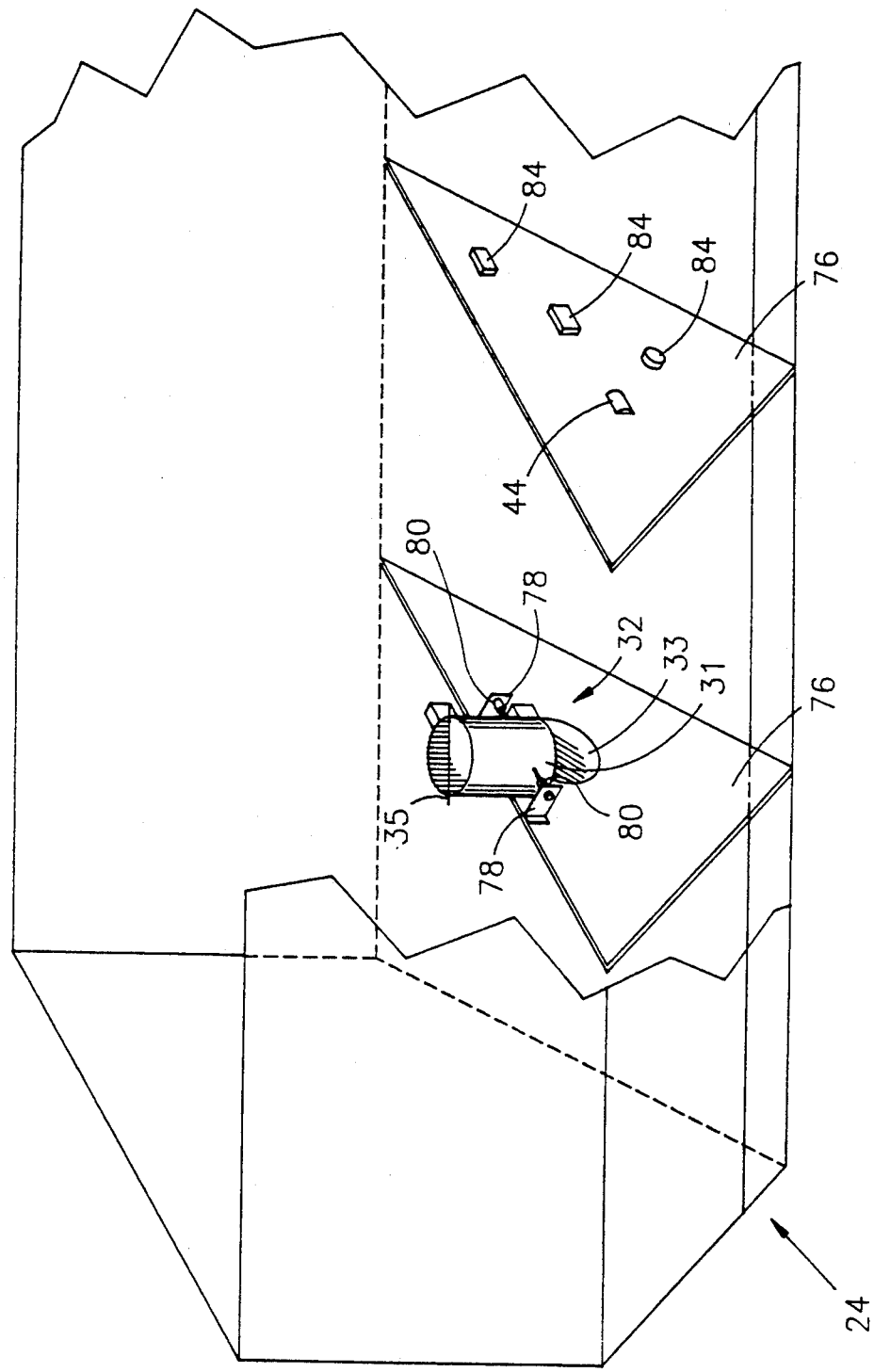
FIG. 5 is a cut-away perspective view of the weigh bucket of FIG. 3 showing a variation of the first preferred embodiment of the invention.

With reference to FIG. 5, a variation of the first preferred embodiment of the invention is shown. In this variation, the test weight device 32, rather than being suspended from the frame 26, is mounted directly to one of the weigh bucket baffles 76. The moisture sensor 44, as well as other conventional sensors 84 that test for characteristics such as a sugar content, oil content, protein content, hardness and color, may likewise be mounted directly to a weigh bucket baffle 76. Such sensing devices are preferably attached to the to the baffles or interior walls 76 instead of the side walls of the weigh bucket 24. If desired, however, the testing devices could be mounted to the side walls.

In one embodiment, the test weight device 32 may be mounted to the baffle 76 by supporting it on two conventional, compression load cells 80 that, in turn, are mounted to two spaced-apart plates 78 attached to the baffle 76 of the weigh bucket 24. The various other sensors 84 are also shown mounted directly to one of the baffles 76. They may be mounted in conventional manners such as by adhesives or conventional mounting fixtures, or by insertion into holes formed in the baffle 76.

In another variation of the first preferred embodiment of the invention, shown in FIG. 3, a sample collection tube 86 may be fitted to the side of the weigh bucket 24 for drawing off a sample of the grain and feeding it to a sample storage receptacle 88. A plurality of sample storage receptacles 88 can be provided so that samples of different plots of crop can be gathered. The harvest operator can thereby retain different samples of the harvested crop.

Figure 6:
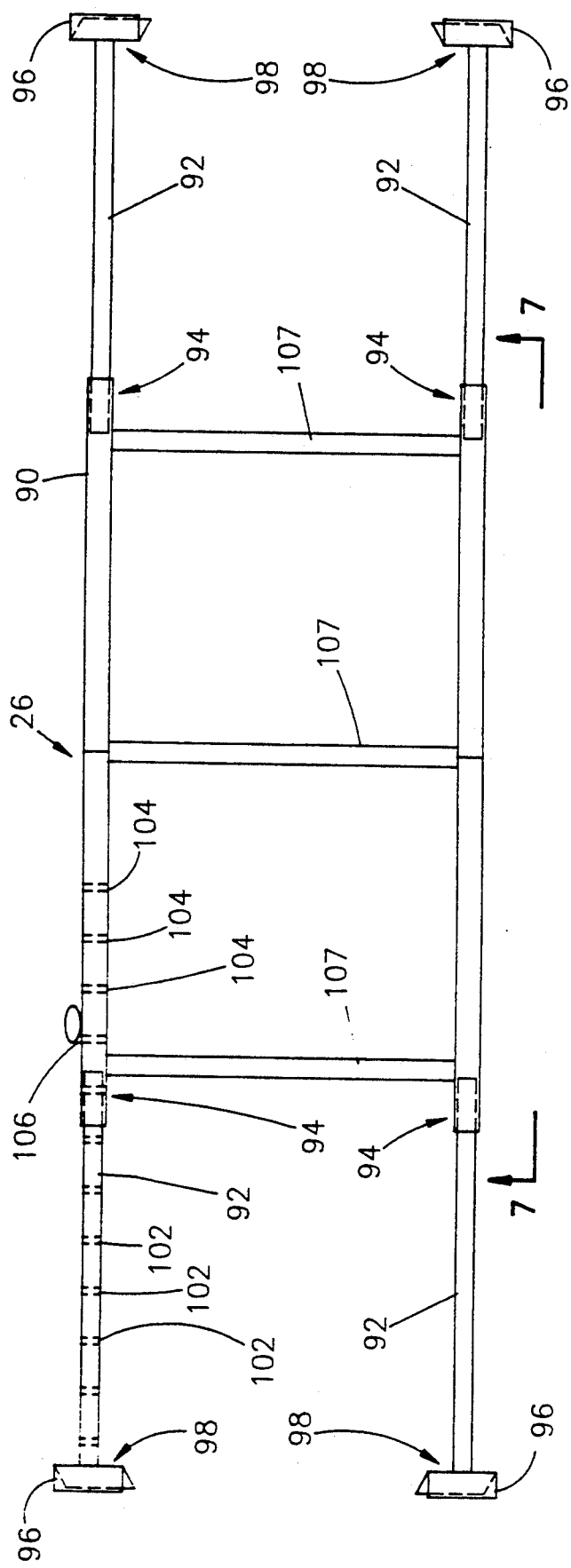
FIG. 6 is a plan view of a frame according to the first preferred embodiment of the invention.
Figure 7:
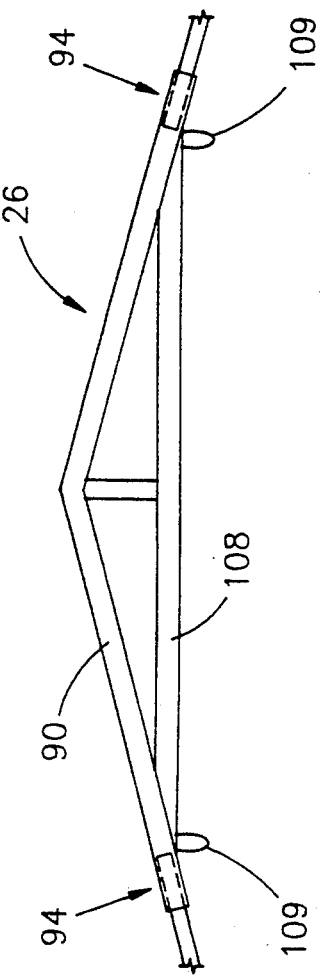
FIG. 7 is a partial side view of the frame of FIG. 6.

FIGS. 6 and 7 illustrate a preferred embodiment of the frame 26 used to assist in suspending the weigh bucket 24 and, in the variation of FIG. 2, the test weight device 32. The frame 26 is preferably formed from two parallel, spaced-apart iron pipes 90 that are bent at their centers so that they form an angle of approximately 160°. The pipes 90 may be approximately fifty-two inches long with an inner diameter of about one-half inch. Four iron rods 92 having approximately one-half inch outer diameters are inserted into the ends 94 of the pipes 90. Angled iron plates 96 are welded to the free ends 98 of the rods 92. When the frame 26 is mounted to a combine or other harvesting machine, the angled plates 96 are attached to the outside perimeter of the grain tank 14. The frame 26 may be modified so that the overall length of the frame 26 can be adjusted to accommodate different sized grain tanks. For example, a series of holes 102 approximately 5/16ths of an inch in diameter may be drilled about every three inches in the rods 92. For clarity, the holes 102 are shown only in one of the rods 92. However, each of the rods would be provided with such holes. Corresponding 5/16ths-inch holes 104 are drilled about every three inches in the half-inch pipe 90 as shown. A snap pin 106 inserted through aligned holes 102 and 104 of the rod 92 and pipe 90 holds the rod 92 in engagement with the pipe 90 at a preset distance. Cross members 107 may be welded to the pipes 90 for added strength, and longitudinal members 108 may also be provided. A chain link 109 of approximately 3/16ths-inch may be welded to the intersections of the members 107 and 108 and the pipes 90 to provide attachment points for the load cells 30 and suspension cables 28. The specific dimensions of the frame 26 may be altered to conform to the size of the grain tank to be used.

Figure 8:
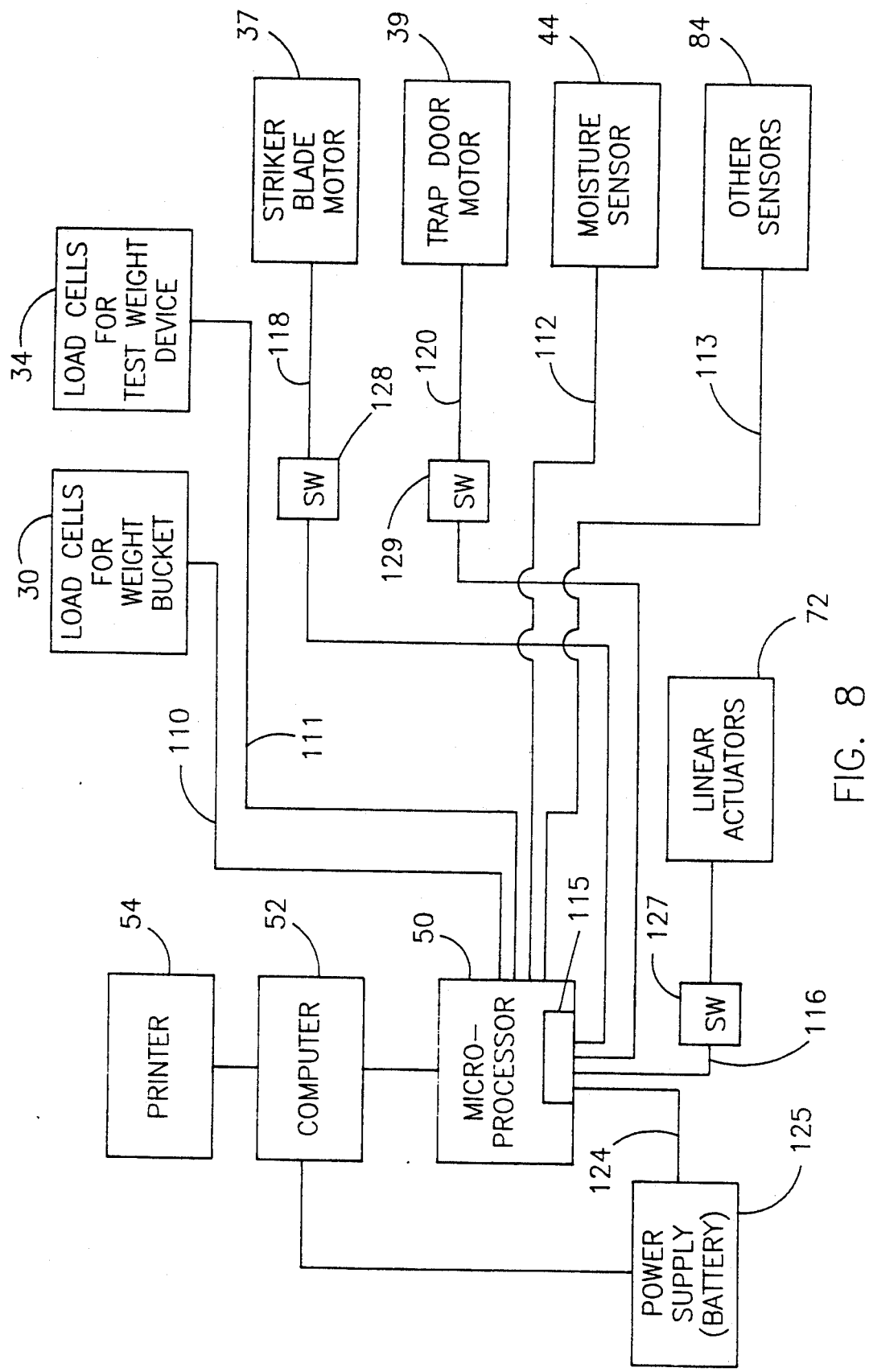
FIG. 8 is a block diagram of the electrical circuit of the first preferred embodiment of the invention in operational position.

FIG. 8 shows a block diagram of the electrical circuit for the components of the first preferred embodiment of the invention. Suitable cables 110, 111, 112, 113 are provided for coupling the load cells 30 for the weigh bucket, the load cell 34 for the test weight device, the moisture sensor 44, and the other sensors 84 to the microprocessor 50. The microprocessor accepts inputs from these measuring devices and provides the data to the lap-top computer 52. The weigh bucket linear actuators 72 are connected to a power source 115, associated with of the microprocessor 50, by standard 12/3 cable 116. Likewise, the motors 37 and 39 for the striker blade and trap door of the test weight device 32 are connected by cables 118 and 120 to the power source 115. The power source 115 may derive its power from the battery 125 of the combine. A standard 12/3 cable 124 may be used to connect the battery 125 to power source 115. The computer 52 and printer 54 may also be coupled to the battery 125 for constant recharging. In order to control the activation of the linear actuators 72, a standard 12-volt 3-way switch 127 is positioned in the cable 116 coupling the actuators 72 to the microprocessor 50. Activation of the motors 37 and 39 may be controlled by separate, standard three-way switches 128 and 129 that are positioned in the connecting cables 118 and 120. Alternatively, motors 37 and 39 can be controlled by a single standard 3-way switch that includes a delay so that the trap door motor 39 is activated to open the trap door after the striker blade has been activated and a test weight measurement has been taken. The switches 127, 128, and 129 preferably are positioned in the cab 22 within reach of the combine operator.

The following description is an example of a preferred operation of the first preferred embodiment of the invention. For purposes of simplicity, the operation is described in connection with the harvesting of a field of corn. However, the same general operation could be used for harvesting other crops. With the use of the present invention, a corn field may be divided into a number of plots formed from about four rows of corn that are approximately sixty to one hundred feet long. The rows may be about 2.5 feet apart, so that the width of the plot is between ten to twelve feet. The growing condition or plant variety may be varied from plot to plot. For example, the harvest operator may have the same variety or germplasm for a series of plots but varies the fertilization rate, chemical treatment, or other environmental condition from plot to plot. Or, the harvest operator may choose to keep the environmental conditions the same for a series of plots but have a different plant variety or germplasm for each plot. With the present invention, the harvest operator can quickly evaluate and compare the output of each plot and, therefore, increase the efficiency and reduce the costs involved in evaluating different growth conditions for a number of plant varieties.

With the present invention, the harvest operator has the capability of obtaining immediately certain characteristic values, described further below, of the corn for each plot during the harvest. When used in conjunction with a cellular phone, information could be transmitted immediately to marketing organizations. Before beginning the harvesting process, the operator weighs the weigh bucket 24 and the test weight device 32 while empty in order to calibrate the system. As the operator of the combine harvests a plot or other predetermined area of field, the weigh bucket 24 and test weight device 32 are filled with the harvested corn. When a single plot is completely harvested, the operator may stop the harvesting process and take a reading of the load cells 30, thereby obtaining a weight measurement of the weigh bucket 24 and its contents. The operator also takes a test weight measurement by activating the striker blade 35 of the test weight device 32 in order to level off the contents of the device and taking a reading of the load cell 34. Readings from the other various sensors, such as the moisture sensor 44, are also taken. The readings could be taken while the harvesting process continues with the combine slowly moving forward. Once the measurements have been completed, the trap door 33 of the test weight device 32 is opened to release the corn from within, and subsequently, the doors 64 of the weigh bucket 24 are opened to allow its contents to drop into the grain tank 14. With the test weight device 32 and weigh bucket 24 emptied, the respective doors are closed and the system recalibrated in preparation for harvesting and testing of the next plot. The test data from the various measuring devices are applied as inputs to the computer 52 via the microprocessor 50 located in the cab 22 for analysis and evaluation. After testing of a plot is completed, the operator restarts the harvesting process and begins harvesting of the next plot. Successive plots may be harvested and tested in a similar manner and data from the different plots compared.

The present invention also provides an efficient method of evaluating research products, such as plant hybrids or varieties. This new method reduces the amount of seed needed for testing, reduces the cost of research for each hybrid or variety tested, reduces the time and labor involved in planting and harvesting research plots, allows more hybrids or varieties to be tested under a greater number of environments, and allows more products to be exposed to current and potential customers.

The first step of the method of the instant invention is to identify the number of hybrids or varieties to test. The method of the instant invention can be used with any commercial plant species such as soybeans, corn, sorghum, wheat, rice, barley, oats, canola, etc. For example, with corn, one entry list of hybrids (for one experiment or test) is selected for each of the standard corn belt maturity zones (zones 2 through 8) listed below:

Maturity Zone 2 -   75-90 day maturity

Maturity Zone 3 - 90–103 day maturity
Maturity Zone 4 - 104–108 day maturity
Maturity Zone 5 - 106–110 day maturity
Maturity Zone 6 - 110–115 day maturity
Maturity Zone 7 - 114–117 day maturity
Maturity Zone 8 - 116–122 day maturity Each entry list of corn genotypes may preferably have three to five commercial hybrids of competitor seed companies, five to seven commercial hybrids from your company, and 16 to 28 new experimental hybrids. Forty, sixty or eighty entries (hybrids) per test are desirable and can be easily handled by the method of the invention. If one objective is to compare hybrid performance within a given maturity zone, e.g., to determine differences between hybrids for eastern and western adaptability, then separate entry lists can be developed for an eastern test and for a western test within a given maturity zone.

Selecting the field location to grow the test and selecting the farmer-cooperator are important. The test location needs to have uniform soil type and be representative of the growing area. Some guidelines for choosing a test site include:
(1) the yields for the site should be consistent with yields in the area;
(2) the test location should maximize yield differences among the hybrids or varieties;
(3) the test location should be consistently high-yielding across years; and
(4) standard farm practices are to be used on the experimental test, including: planting, cultivating, spraying and harvesting.

By using the method and only one device of the present invention, 20 locations, each having 40 entries per test, can be easily evaluated during one growing season. Two devices will allow conducting as many as 80 tests at 35 separate locations.

A check hybrid is selected for each maturity zone entry list. This check hybrid should be a top-performing hybrid or a new experimental hybrid with moderate plant height and proven adaptability across environments. It is preferable to choose an early maturing check hybrid for the zone, since the hybrid will typically be harvested early from the cross-alleys and border rows to allow easier viewing of the experimental plots. Each maturity zone should have the same check hybrid for each test within this zone, which allows comparing hybrid data, so the data and statistical analysis of hybrid data across locations within a maturity zone can be compared. Adequate seed quantities of the check hybrid should be available for use in the cross-alleys and the border rows.

It is preferable to select farmer-cooperators who have: (1) John Deere 7000 planters, with capacities of at least 4 rows, up to 18 rows; or John Deere Maxemerge finger planters, and (2) access to modern John Deere, International Harvester or Gleanor combines. The farmer-cooperators must all be instructed in the procedures involved in the test, from planting to harvest, and what is expected of them at each stage.

The next step is to package the experimental seeds into planting packets. Each planting packet will contain 125 kernels (125K) of one hybrid to be planted in one row of the experimental plot. The total number of seeds required for each hybrid is determined by multiplying the number of locations by 500K per location. If the seed size is very small (or derived from hand pollinations), add 5–10 kernels per row to allow for doubles.

(Number of Locations)(500K/Location) =

Seed Required Per Hybrid

The packaging of the seed can be accomplished in at least three different ways: (1) hand-count the seed; (2) machine-count with a seed counter; or (3) obtain the weight of 125K plus the packet, then weigh the remaining packets with planting envelopes tared out to the same weight as the original 125K.

Figure 11:
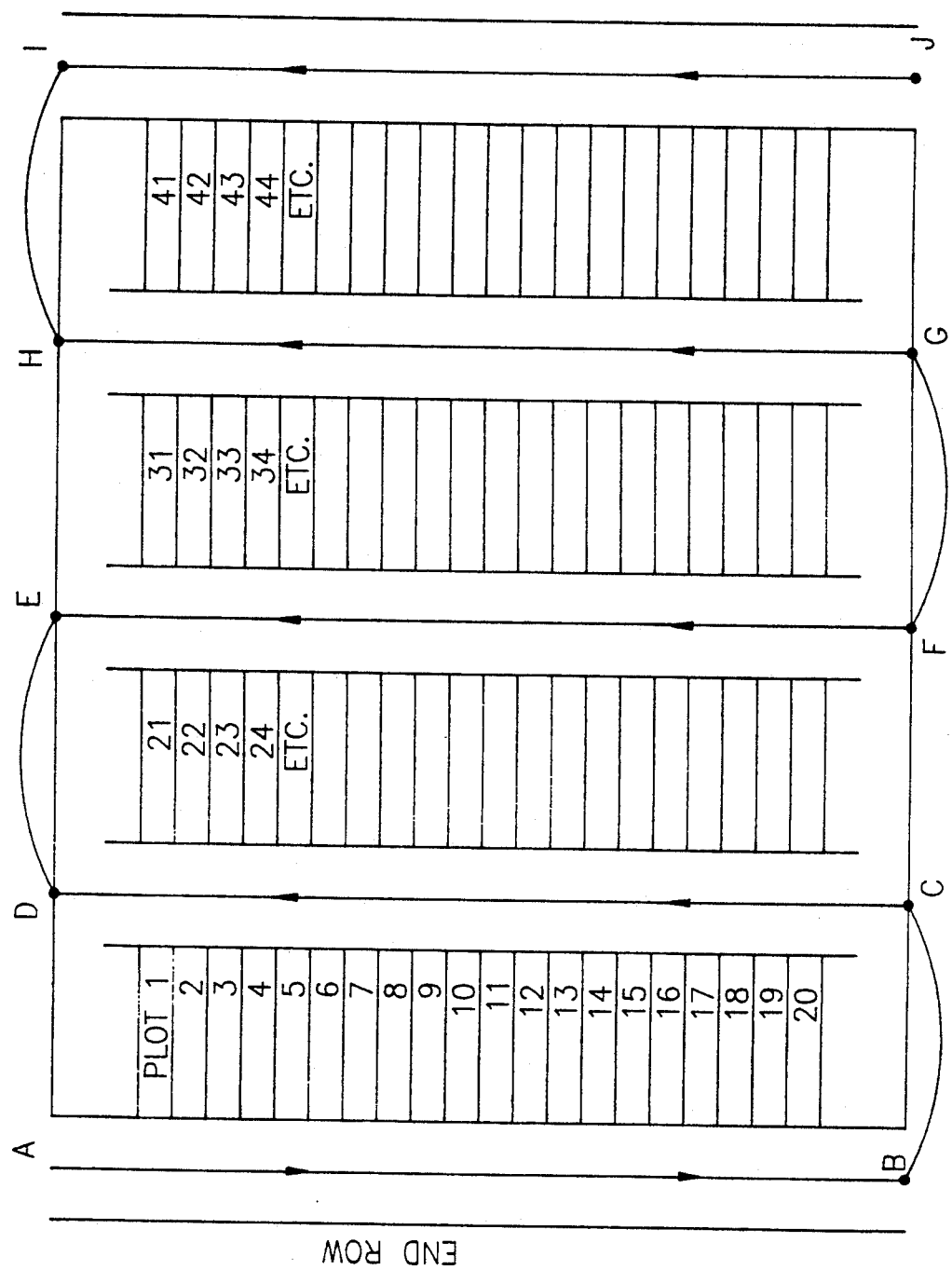
FIG. 11 is a schematic plan view of an experimental field layout for 8-row, 12-row, 16-row and 18-row planters.

Preferably, the planting plans are printed using Lotus spreadsheet software. If the actual field planting differs from the printed planting plan, these changes must be recorded. A field layout is shown in FIG. 11. Field flags or markers are placed at field points A through J so that the operator of the planter can visually guide on these flags or markers while driving across the field. To plant the border rows surrounding the test, the planter operator guides the center of the planter so it aligns directly over the straight line between two flags at opposite ends of the test (such as the line between A and B, or between C and D, etc). Table 2 lists the distances between the flags across the end of a test in the field. These distances vary depending on whether an 8-row, 12-row, 16-row or 18-row planter is being used. The flag placement distances at points A through J for 4-row and 6-row planters are shown in Table 2.

TABLE 1

| Flag Placement at Points A–J* (For 8, 12, 16 and 18 Row Planters) | |
|---|---|
| Distance | Between Field Points |
| ¼ Planter Width | End Row to A |
| | End Row to B |
| 1 Planter Width | A to D |
| + 1 Plot Length | D to E |
| | E to H |
| | H to I |
| | B to C |
| | C to E |
| | E to G |
| | G to J |

*See FIG. 11.

TABLE 2

| Flag Placement at Points A–J** (4 and 6 Row Planters) | |
|---|---|
| Distance | Between Field Points |
| ¼ Planter Width | End Row to A |
| | End Row to B |
| 2 Planter Widths | A to D |
| + 1 Plot Length | D to E |
| | E to H |
| | H to I |
| | B to C |
| | C to F |
| | F to G |
| | G to J |

Figure 12:
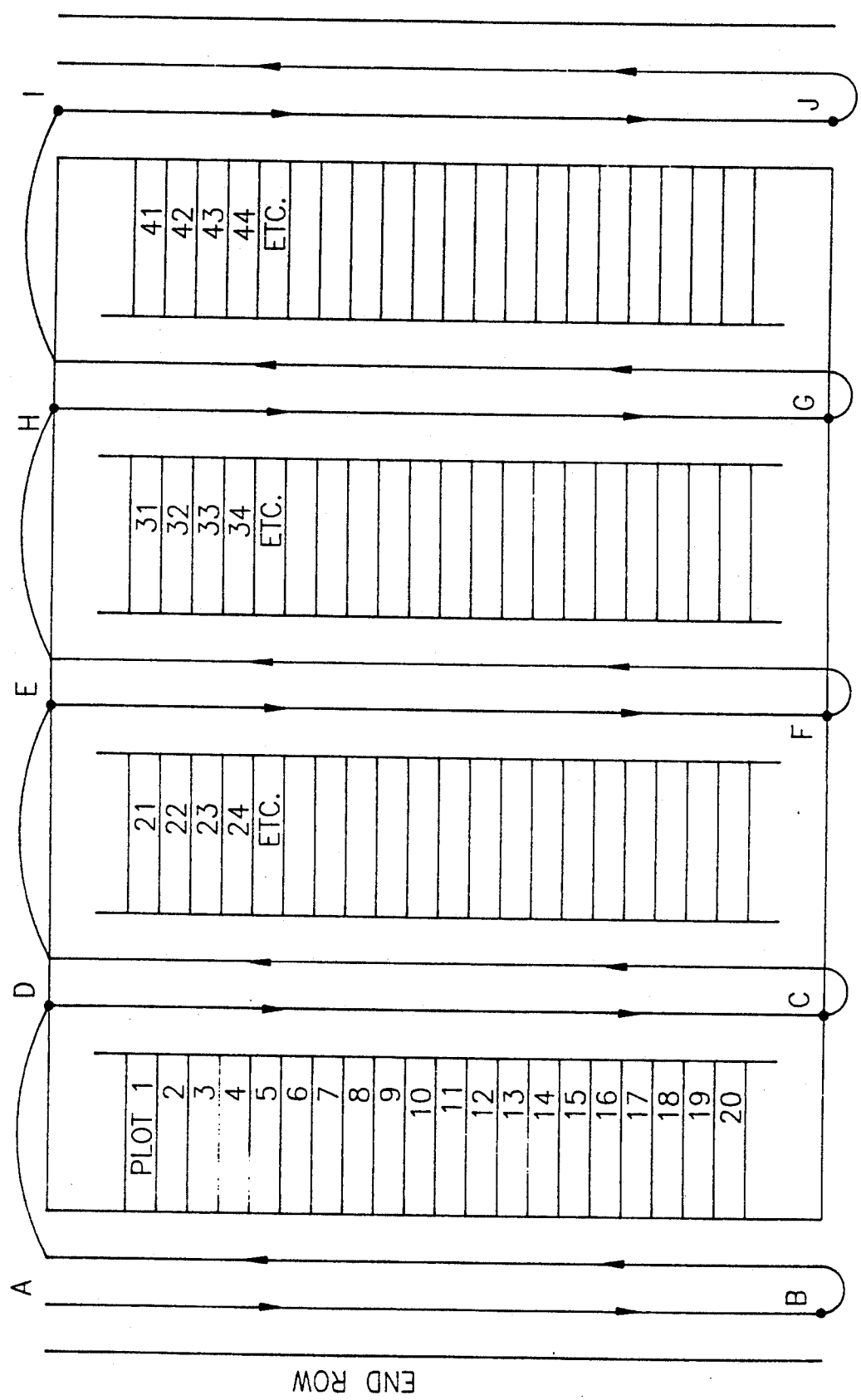
FIG. 12 is a schematic plan view of an experimental field layout for 4-row and 6-row planters.

**See FIG. 12.

Flags are placed at points A and B at opposite ends of the test (see FIG. 11) and at one-half the distance of the planter width from the end row. The end row is the first row immediately adjacent the experimental testing area of the field. The flags placed at points D and C are placed at opposite ends of the experimental test (see FIG. 11). Flags D and C are located a distance of one planter width plus one plot length from flags A and B, respectively (as defined in Table 2). The lines through points D and A and through points C and B should be approximately perpendicular to the end row. The Plot Length is determined by selecting the desired plant population (plants per acre) in column 2 of Table 3. For example, if the desired plant spacing is 8.0 inches and 26,100 plants per acre, then the desired plot length is 75 feet.

TABLE 3

Plot Length and Total Test Length For Plants Having 30" Row Widths

| Average Plant Spacing (in.) | Plants Per Acre | Plot Length* | Total Test Length for for Four Ranges (Number of Planter Rows) | | | |
|---|---|---|---|---|---|---|
| | | | 4,8 | 6,12 | 16 | 18 |
| 5.5 | 37,600 | 49 | 297.2 | 347.2 | 397.2 | 422.2 |
| 5.7 | 36,200 | 51 | 305.5 | 355.5 | 405.5 | 430.5 |
| 6.0 | 34,800 | 55 | 318.0 | 368.0 | 418.0 | 443.0 |
| 6.2 | 33,400 | 57 | 326.3 | 376.3 | 426.3 | 451.3 |
| 6.5 | 32,100 | 60 | 338.8 | 388.8 | 438.8 | 463.8 |
| 6.8 | 30,700 | 63 | 351.3 | 401.3 | 451.3 | 476.3 |
| 7.0 | 29,900 | 65 | 359.7 | 409.7 | 459.7 | 484.7 |
| 7.3 | 28,600 | 68 | 372.2 | 422.2 | 272.2 | 297.2 |
| 7.5 | 27,900 | 70 | 380.5 | 430.5 | 480.5 | 505.5 |
| 7.8 | 26,500 | 73 | 393.0 | 443.0 | 493.0 | 518.0 |
| 8.0 | 26,100 | 75 | 401.3 | 451.3 | 501.3 | 526.3 |
| 8.3 | 25,100 | 78 | 413.8 | 463.8 | 513.8 | 538.8 |
| 8.5 | 24,400 | 81 | 422.2 | 472.2 | 522.2 | 547.2 |
| 8.8 | 23,600 | 84 | 434.7 | 484.7 | 534.7 | 559.7 |
| 9.0 | 23,000 | 86 | 443.0 | 493.0 | 543.0 | 568.0 |
| 9.3 | 22,300 | 89 | 455.5 | 505.5 | 555.5 | 580.5 |
| 9.5 | 22,000 | 91 | 463.8 | 513.8 | 563.8 | 588.8 |
| 10.0 | 20,900 | 96 | 484.7 | 534.7 | 584.7 | 609.7 |
| 10.3 | 20,200 | 99 | 497.2 | 547.2 | 597.2 | 622.2 |
| 10.5 | 18,899 | 101 | 505.5 | 555.5 | 605.5 | 630.5 |
| 10.7 | 19,500 | 103 | 513.8 | 563.8 | 613.8 | 638.8 |
| 11.0 | 19,000 | 107 | 526.3 | 576.3 | 626.3 | 651.3 |
| 11.5 | 18,100 | 112 | 547.2 | 597.2 | 647.2 | 672.2 |
| 12.0 | 17,400 | 117 | 568.0 | 618.0 | 668.0 | 693.0 |
| 12.5 | 16,700 | 122 | 588.8 | 638.8 | 688.8 | 713.8 |
| 13.0 | 16,000 | 127 | 609.7 | 659.7 | 709.7 | 734.7 |
| 13.5 | 15,500 | 133 | 630.5 | 680.5 | 730.5 | 755.5 |
| 14.0 | 14,900 | 138 | 651.3 | 701.3 | 751.3 | 776.3 |
| 15.0 | 13,900 | 148 | 693.0 | 743.0 | 793.0 | 818.0 |

*For 125 seeds; minus 8 feet.

Columns 4 through 7 of Table 3 list the total test length required for four ranges at different planter row numbers and different planting rates. For example, if the planter you are using is either a 4-row or an 8-row planter, then the test length for 26,100 plants per acre is 401.3 feet. The total test width is determined by multiplying the number of test rows per range by 2.5 feet, plus any border rows by 2.5 feet.

Once the flags are positioned at the correct distances in the field, then end rows and cross-alleys are planted by guiding and aligning the center of the planter on the straight line between the flags at opposite ends of the test. When all border rows are planted, then the planter boxes are emptied to insure all seeds are removed from the seed cups. Spinning the drive mechanism will empty any seed remaining in the cups. Before planting each plot of the test, the planter drives must be engaged before dumping the 125 seeds into each seed cup.

The plots are planted across the test shown in FIG. 11, e.g., Plot 1, then 21, 31 and 41. Immediately prior to planting each plot, the designated seed for that plot is placed into the seed cups of the planter unit. It is important that pieces of the envelopes do not fall into the seed cups, as this will interfere with the planter fingers and the kernels will not plant properly. Preferably, the planter operator starts planting on the third cross (border) row immediately before the plot and stops the planter on the third cross-alley row previous to the next plot. The planter operator should watch the seed monitor to insure all seed in each row has been planted. No seed should remain in any of the seed cups after completely planting a plot.

Normally the planter is not raised out of the soil, as the planter crosses the field. If the planter malfunctions and the operator is not sure if all the seeds have been planted, prior to entering the next plot the operator must lift the planter off the ground and spin the planting units, or back up the planter into the cross rows (border rows) and plant out all the seed until the seed cups are empty. When the planter reaches the end of each plot, the operator should keep the planter in the ground for five or more row widths to ensure excess kernels are planted prior to the next plot. The seed monitor will indicate whether the units are empty of seed.

It is important to label the field test with stakes or other markers in the field to clearly identify the test's boundaries. Some or all of the individual plots can be staked, if desired. When wire flags are used, they should be removed prior to harvest to avoid getting the wire entangled in the header of the combine.

During the growing season, field data on the plots may be obtained, such as early vigor, plant population, any gaps in rows, diseases, insect damages, fertility or herbicide damage, flowering notes, ear and plant height, root lodging, stalk lodging, and the harvest traits of yield, moisture, test weight, cob score, grain quality, and other traits.

Table 4 shows a sample computer output of the type that might be obtained from the testing and evaluation of a series of harvested corn plots:

TABLE 4

| GE NUM | HYBRID | MAT (DAYS) | WEIGHT (LBS) | % M | YIELD PER ACRE (BU/ACRE) | ROW WIDTH (IN.) | # ROWS | PLOT LENGTH (FT.) |
|---|---|---|---|---|---|---|---|---|
| 348 | | 105 | 148.0 | 20.9 | 183.43 | 30 | 4 | 58.8 |
| 92 | C4554 | 105 | 170.5 | 21.8 | 172.26 | 30 | 4 | 71.3 |
| 309 | K6305 | 108 | 167.9 | 24.2 | 172.29 | 30 | 4 | 68.0 |
| 406 | | 104 | 161.5 | 21.7 | 168.71 | 30 | 4 | 69.0 |
| 436 | SIG7334 | 105 | 173.4 | 23.3 | 170.04 | 30 | 4 | 72.0 |
| 322 | TG | 109 | 186.0 | 27.7 | 173.14 | 30 | 4 | 71.5 |
| 277 | | 104 | 158.8 | 22.5 | 167.84 | 30 | 4 | 67.5 |
| 414 | P3504 | 108 | 180.9 | 25.7 | 170.66 | 30 | 4 | 72.5 |
| 52 | C5144 | 106 | 180.2 | 24.7 | 168.80 | 30 | 4 | 74.0 |
| 71 | P3615 | 103 | 164.7 | 20.6 | 164.91 | 30 | 4 | 73.0 |
| 228 | | 106 | 178.5 | 25.1 | 167.45 | 30 | 4 | 73.5 |
| 92 | C4554 | 105 | 166.8 | 21.3 | 163.35 | 30 | 4 | 73.8 |
| 353 | | 107 | 154.3 | 24.1 | 165.86 | 30 | 4 | 65.0 |
| 72 | P3585 | 105 | 143.0 | 24.9 | 164.77 | 30 | 4 | 60.0 |
| 221 | X401 | 100 | 162.7 | 22.3 | 161.63 | 30 | 4 | 72.0 |
| 52 | C5144 | 106 | 159.6 | 23.5 | 160.56 | 30 | 4 | 70.0 |

TABLE 4-continued

| | | | | | | | | |
|---|---|---|---|---|---|---|---|---|
| 222 | C4595 wx | 106 | 157.5 | 23.5 | 158.56 | 30 | 4 | 70.0 |
| 454 | | 105 | 166.7 | 23.8 | 158.02 | 30 | 4 | 74.0 |
| 442 | | 106 | 163.1 | 22.6 | 154.94 | 30 | 4 | 75.0 |
| 313 | HU5510 | 109 | 160.0 | 23.5 | 153.30 | 30 | 4 | 73.5 |
| 90 | C4303 | 99 | 154.2 | 21.9 | 150.83 | 30 | 4 | 73.5 |
| 356 | | 104 | 150.8 | 21.1 | 150.04 | 30 | 4 | 73.0 |
| 320 | GST8574 | 108 | 150.1 | 24.4 | 152.63 | 30 | 4 | 73.0 |
| 51 | C3151 | 104 | 136.2 | 23.3 | 150.85 | 30 | 4 | 63.8 |
| 353 | | 107 | 162.5 | 24.1 | 151.38 | 30 | 4 | 75.0 |
| 68 | P3751 | 97 | 158.1 | 24.4 | 150.72 | 30 | 4 | 73.0 |
| 92 | C4554 | 104 | 155.6 | 22.2 | 148.58 | 30 | 4 | 75.0 |
| | AVERAGE | | 162.3 | 23.3 | 162.08 | | | |

| GE NUM | HYBRID | CORRECTION FACTOR | POPULATION (# PLANTS/ACRE) | INCOME PER ACRE | TEST WEIGHT (LB/BU) |
|---|---|---|---|---|---|
| 348 | | 110.465 | 24,000 | $401.92 | 55 |
| 92 | C4554 | 110.465 | 24,000 | $374.99 | 56 |
| 309 | K6305 | 110.465 | 24,000 | $370.25 | 56 |
| 406 | | 110.465 | 24,000 | $367.19 | 59 |
| 436 | SIG7334 | 110.465 | 24,000 | $366.99 | 57 |
| 322 | TG | 110.465 | 24,000 | $365.16 | 56 |
| 277 | | 110.465 | 24,000 | $363.64 | 55 |
| 414 | P3504 | 110.465 | 24,000 | $363.59 | 53 |
| 52 | C5144 | 110.465 | 24,000 | $361.39 | 60 |
| 71 | P3615 | 110.465 | 24,000 | $360.84 | 54 |
| 228 | | 110.465 | 24,000 | $357.55 | 59 |
| 92 | C4554 | 110.465 | 24,000 | $357.07 | 58 |
| 353 | | 110.465 | 24,000 | $355.98 | 56 |
| 72 | P3585 | 110.465 | 24,000 | $351.92 | 57 |
| 221 | X401 | 110.465 | 24,000 | $350.07 | 55 |
| 52 | C5144 | 110.465 | 24,000 | $345.26 | 53 |
| 222 | C4595 wx | 110.465 | 24,000 | $340.76 | 54 |
| 454 | | 110.465 | 24,000 | $338.94 | 56 |
| 442 | | 110.465 | 24,000 | $334.43 | 57 |
| 313 | HU5510 | 110.465 | 24,000 | $328.92 | 58 |
| 90 | C4303 | 110.465 | 24,000 | $326.57 | 57 |
| 356 | | 110.465 | 24,000 | $326.38 | 55 |
| 320 | GST8574 | 110.465 | 24,000 | $325.61 | 54 |
| 51 | C3151 | 110.465 | 24,000 | $323.81 | 61 |
| 353 | | 110.465 | 24,000 | $323.41 | 60 |
| 68 | P3751 | 110.465 | 24,000 | $321.32 | 56 |
| 92 | C4554 | 110.465 | 24,000 | $320.91 | 56 |
| | AVERAGE | | | $349.07 | |

Each row of data underneath the column headings of Table 1 represents a single harvested plot of corn. The "GE NUM" column and "HYBRID" column identify the corn variety or germplasm of the plot. These codes may be entered into the computer 52 by the harvest operator as the plot is being harvested. The "MAT" column represents the maturity of the crop, equal to the number of days from emergence to harvest. This quantity may also be entered into the computer by the harvest operator before harvest.

The next column, "WEIGHT", represents the weight of the harvested plot in pounds based on a measurement taken by the weigh bucket 24 and load cells 30. The "% M" is also test data corresponding to moisture content measurement performed by the moisture sensor 44. This measurement gives the percentage of water in the corn.

From the measured weight and percentage moisture content, the yield per acre for the harvested plot of corn can be calculated by the computer 52 using the following formula:

$$\text{YIELD PER ACRE} = \frac{(100 - \% \text{ MOISTURE}) \times \text{WEIGHT} \times \text{CORRECTION FACTOR}}{(\text{PLOT LENGTH} \times \text{ROW WIDTH} \times \text{NUMBER OF ROWS})}$$

The yield per acre is given in bushels per acre and is indicative of the production level of the crop. The amount is adjusted to a standard 15.5% moisture content for the corn by using a "CORRECTION FACTOR". "CORRECTION FACTOR" is a known value that is used to determine what the weight of a measured crop would be if its percentage of moisture was 15.5%. For corn, the correction factor is typically known to be about 110,465. For soybeans, the correction factor normally is about 100.138, and for grain sorghum, about 108.538. The plot length, row width, and number of rows are values the harvest operator enters into the computer 52 for each plot. The yield per acre formula could be modified to include the test weight measurement.

The harvest operator can obtain immediate economic value of a harvested plot by having the computer calculate the income per acre based on the following formula:

$$\text{INCOME PER ACRE} = (\text{YIELD PER ACRE} \times \text{PRICE PER BUSHEL}) - ((\% \text{ MOISTURE} - 15.5) \times 2\text{c})$$

The "price per bushel" represents the current market value of corn in dollars per bushel if the corn had a 15.5% moisture content. For example, the current price is $2.25 per bushel. When multiplied by the yield per acre, the value of the corn based on a 15.5% water content is determined. The "15.5" in the equation represents the standard percentage moisture content against which the measured moisture content is compared. The difference between the two is then multiplied by two cents, and the total is subtracted from the total value of the corn in order to determine the true value of the corn. Basically, two cents is subtracted from the value of the corn for every percentage of moisture it has above the standard 15.5%.

Also included on Table 4 is the "POPULATION" of the plot which may be entered by the harvest operator to show the number of plants per acre each plot had. The "TEST WEIGHT" column represents the measurement taken by the test weight device 32 converted into pounds per bushel. The table can also include test data corresponding to measurements taken by the other sensors 84, such as the oil content, sugar content, protein content, hardness and color sensors. In addition, different values of the crop can be determined by the computer using the test data.

The data shown in Table 4 are preferably computed and displayed immediately after each plot is harvested so that the operator can readily assess the quality and value of the crop and make certain farming and marketing decisions on the spot. For example, if cellular phones or mobile radios are used, the operator can, use the evaluation information to purchase supplies, contact various elevator operators to determine which would give the best price for the quality of corn the harvest operator has, and to organize farming operations. The table can be modified to display the tests results from the other sensors 84, as well as include other predetermined characteristics of a plot that may be helpful to the operator for making farming and marketing decisions.

Figure 9:
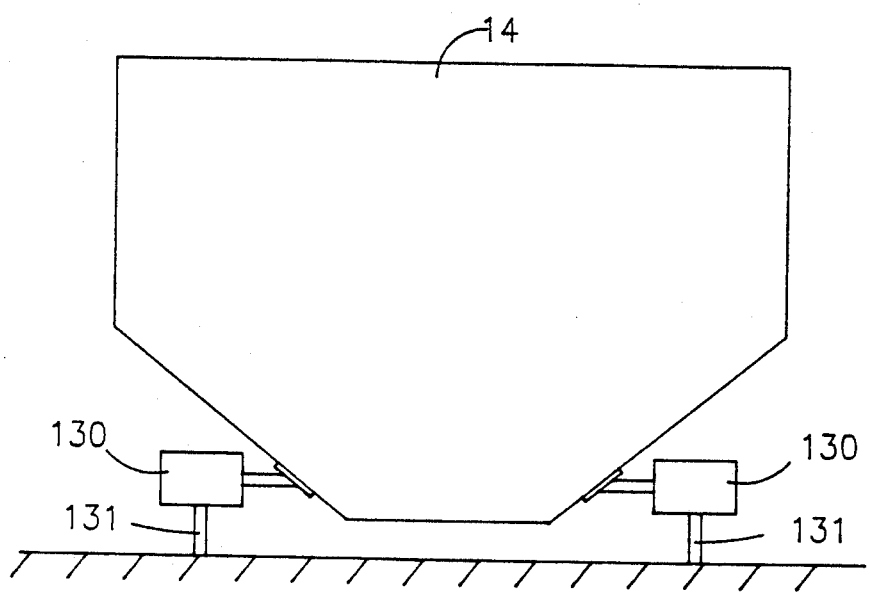
FIG. 9 is a schematic side view of a combine grain tank illustrating a second preferred embodiment of the invention.

With reference to FIG. 9, a second preferred embodiment of the invention is shown. The second preferred embodiment of the invention is essentially the same as the first embodiment discussed previously, except that in this embodiment the weight of a harvested plot is not taken by the weigh bucket 24 of FIG. 2. Rather, the grain tank 14 of the combine 10 is fitted with a plurality of conventional compression load cells 130. Compression load cells 130 are positioned under the grain tank 14 by mounting fixtures 131 so that weight measurements of grain fed to the tank 14 can be made. As in the case of the first preferred embodiment, suitable cabling (not shown) is provided for connecting the load cells 130 to the microprocessor 50 positioned in the cab 22. The operation of the second embodiment of the invention is basically the same as the first embodiment. To take measurements of a series of harvested plots, the tare weight of the tank is recalculated after each successive plot.

Figure 10:
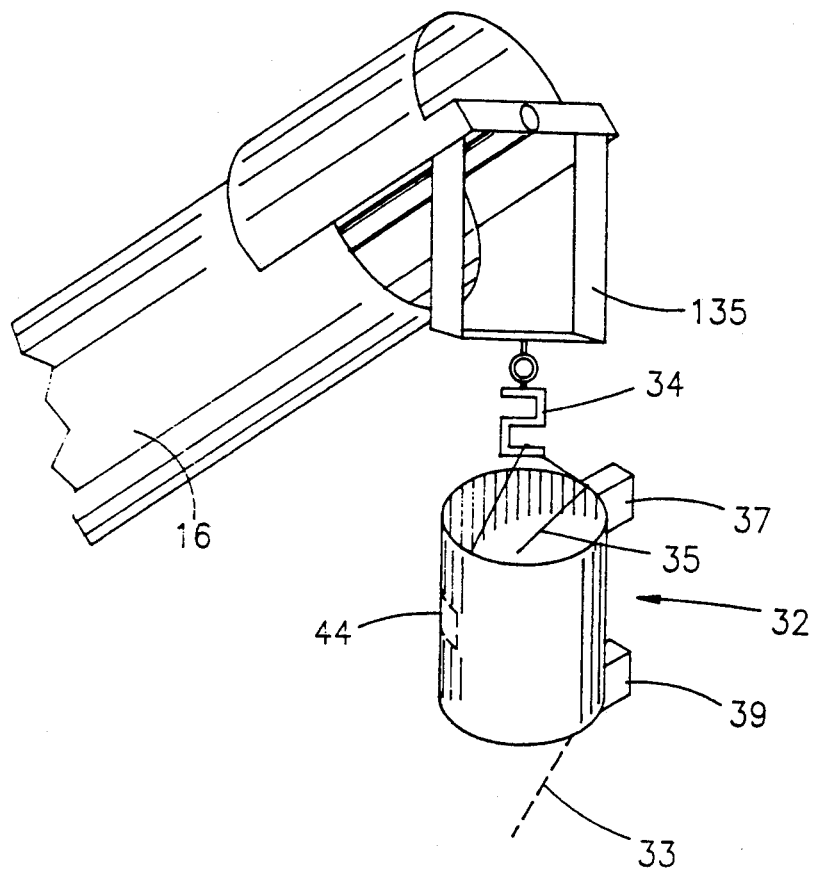
FIG. 10 is a schematic perspective view of an alternate embodiment of the invention for mounting a test weight device and percentage moisture sensing device to a combine auger.

In a variation of the second preferred embodiment of the invention, test weight device 32 is not suspended from the frame 26 of FIG. 2. With reference to FIG. 10, a bracket member 135 may be provided for suspending the test weight device 32 directly from the auger 16. The auger hood 40 would, therefore, not be necessary. Alternatively, the test weight device 32, as well as the moisture sensor 44 and other sensors 84, could be mounted directly to the walls of the grain tank 14 or other fixed structure within the grain tank in the manner described with reference to FIG. 5.

While the invention has been described with reference to specific embodiments, it will be understood that the invention is capable of further modifications. The appended claims are intended to cover any variations of, uses for, and adaptations of the invention following, in general, the principles of the invention, and including such departures from the present disclosure as fall within known and customary practices within the art to which the invention pertains.

What is claimed is:

1. A method of harvesting and analyzing harvest data in a field of plant hybrids or varieties, which comprises:
   (a) harvesting the experimental plots of said plant hybrids or varieties with a combine having a testing and evaluating assembly removably attached thereto, and a computer on line with said assembly,
   (b) recording the harvest data obtained from said harvesting of experimental plots,
   (c) storing said harvest data in said computer, and
   (d) generating reports in said field, wherein said testing and evaluating assembly comprises:
   first crop collection means for collecting a first quantity of the crop;
   weighing means for determining a weight of the first quantity of crop collected by said first crop collection means and outputting a first signal corresponding to the weight;
   an attachment assembly comprising a support frame which is removably attached to the outer perimeter of a crop storage tank and at least two suspension members coupled to said frame, said weighing means and said first crop collection means, such that said first crop collection means is suspended in said crop storage tank; and
   processing means for receiving and processing said first signal and determining a quality of the crop based on said first signal.

2. The method of claim 1, wherein said testing and evaluating assembly is removably suspended from the top of said crop storage tank.

3. The method of claim 1, wherein said testing and evaluating assembly has the capacity of holding in excess of 400 pounds of grain in said first crop collection means.

4. The method of claim 1, wherein said testing and evaluating assembly is removably attached to the inside of said crop storage tank.

5. The method of claim 1 wherein the harvesting of two or more of said experimental plots is accomplished in one continuous process across the test, without pausing or stopping between said plots.

6. A method of harvesting and analyzing harvest data in a field of plant hybrids or varieties, which comprises:
   (a) harvesting said plant hybrids or varieties with a combine having a testing and evaluating assembly attached thereto, and a computer on line with said assembly,
   (b) recording the harvest data obtained from said harvest of said plant hybrids or varieties,
   (c) storing said harvest data in said computer, and
   (d) generating reports in said field, wherein said testing and evaluating assembly comprises:
   a vehicle having a crop storage tank therein;
   weighing means coupled to said crop storage tank for determining a weight of a first quantity of crop collected in said crop storage tank and outputting a first signal corresponding to the weight;
   first means for attaching said weighing means to said vehicle; and
   processing means, coupled to the weighing means, for receiving and processing said first signal and determining a quality of the crop based on said first signal.

7. The method of claim 6, wherein said reports are generated by a spread sheet or database software package.

8. The method of claim 6, wherein said computer is located on said combine.

9. The method of claim 6, wherein said method of harvesting and analyzing harvest data is accomplished in one continuous process across said field, without pausing or stopping.

* * * * *